US012558916B2

(12) United States Patent
Nam

(10) Patent No.: US 12,558,916 B2
(45) Date of Patent: Feb. 24, 2026

(54) METAL DECORATION MANUFACTURING APPARATUS AND METHOD

(71) Applicant: Kilwan Nam, Seoul (KR)

(72) Inventor: Kilwan Nam, Seoul (KR)

( * ) Notice: Subject to any disclaimer, the term of this patent is extended or adjusted under 35 U.S.C. 154(b) by 45 days.

(21) Appl. No.: 18/744,837

(22) Filed: Jun. 17, 2024

(65) Prior Publication Data

US 2025/0074102 A1 Mar. 6, 2025

(30) Foreign Application Priority Data

Sep. 6, 2023 (KR) ........................ 10-2023-0118344
Jan. 29, 2024 (KR) ........................ 10-2024-0013162

(51) Int. Cl.
*B44B 5/02* (2006.01)
*B44B 5/00* (2006.01)

(52) U.S. Cl.
CPC ............ *B44B 5/026* (2013.01); *B44B 5/0052* (2013.01); *B44B 5/009* (2013.01)

(58) Field of Classification Search
CPC ........ B44B 5/026; B44B 5/0052; B44B 5/009
See application file for complete search history.

(56) References Cited

U.S. PATENT DOCUMENTS 5,226,993 A * 7/1993 Tukakoshi .............. B44C 1/162 446/124
2006/0027109 A1* 2/2006 Criss ....................... B44C 3/082 101/28

FOREIGN PATENT DOCUMENTS

| | | | | | |
|---|---|---|---|---|---|
| CN | 217919326 U | * | 11/2022 | | |
| CN | 119327940 A | * | 1/2025 | ............ | B21D 37/12 |
| JP | 04092000 A | * | 3/1992 | | |
| KR | 10-1388626 B1 | | 4/2014 | | |
| KR | 20-0483961 Y1 | | 7/2017 | | |
| KR | 102573984 B1 | * | 9/2023 | .............. | B44C 3/04 |

* cited by examiner

*Primary Examiner* — Christopher E Mahoney
*Assistant Examiner* — Marissa Ferguson-Samreth
(74) *Attorney, Agent, or Firm* — KORUS Patent, LLC; Seong Il Jeong

(57) ABSTRACT

The present invention rapidly and reliably attaches the letters and/or figures of an original plate for a metal decoration onto leather by using a pressing apparatus and facilitates the lateral inspection of a final item onto which the leather will be attached.

5 Claims, 11 Drawing Sheets

1

METAL DECORATION MANUFACTURING APPARATUS AND METHOD

CROSS-REFERENCE TO RELATED APPLICATION

This application claims the benefit of Korean Patent Application No. 10-2024-0013162 filed on Jan. 29, 2024, which is hereby incorporated by reference herein in its entirety.

BACKGROUND

1. Technical Field

The present invention relates to an apparatus and method for manufacturing a metal decoration. In particular, the present invention relates to an apparatus and method for manufacturing a metal decoration that facilitate the lateral inspection of a final material attached to a final item, i.e., a bag.

2. Description of the Related Art

In general, metal decorations each forming a product's brand or a manufacturer's logo are fixed to surfaces of various products such as clothing, wallets, or bags made of fiber or leather.

Metal decorations traditionally involve using an adhesive. Alternatively, there is a method of plating letters or shapes that constitute a metal decoration. Korean Utility Model Registration No. 20-0483961 discloses plating each letter using a unit decoration element. Korean Patent No. 10-1388626 discloses a method that modularizes a group of characters into a single element and subjects the single element to a corrosion process, a bending process, a perforation process, and an insertion process.

However, these prior technologies have the problems of poor precision and reduced work efficiency because it is necessary to detach decoration elements for respective letters or figures and attach them to rubber in a final process.

The present applicant proposes a method of manufacturing a metal decoration in Korean Patent No. 10-2573984. This method includes the steps of: producing a circular decoration through an injection process; providing a base decoration by removing unnecessary portions from the circular decoration; plating the base decoration; and integrating the logo of the base decoration with a plate by combining it with the plate through a combination process.

This process provides advantages in that the attachment of a logo is reliably performed and is convenient. However, before the logo is attached to a final product, the side of the logo is covered with a plate, making it difficult to inspect the side of the logo for the quality thereof.

In order to overcome the problems of the prior art described above, the present invention has been newly contrived to efficiently perform the attachment of a metal decoration and facilitate quality inspection.

SUMMARY

An object of the present invention is to provide a manufacturing method that may easily manufacture a metal decoration in which at least two letters, figures, symbols, or the like are sequentially engraved, and a metal decoration that is manufactured by the method.

In order to achieve the above-described object, the present invention provides an economical and efficient manufacturing method and apparatus that may manufacture an original plate indicating characters or letters and attach them onto a final product by using a press apparatus.

According to an aspect of the present invention, there is provided a metal decoration manufacturing apparatus for attaching the decoration of an original plate onto a final material, the metal decoration manufacturing apparatus including: an upper die; and a lower die spaced apart from the upper die, and made of a flexible material; wherein a carrier provided with guide holes is inserted into a lower portion of the upper die; and wherein lower die grooves corresponding to decoration portions of the original plate are formed in the lower die.

The metal decoration manufacturing apparatus may further include a washer including washer segments to be attached onto the rear surface of a final material, and the washer segments have shapes obtained by cutting the decoration portions on the rear surface of the original plate.

Pins may protrude from the individual decoration portions on the rear surface of the original plate, and washer slots may be formed in the washer segments to accommodate the respective pins.

The guide holes of the carrier may have the same shapes as the washer segments of the washer, die grooves having the same shapes as the guide holes may formed on the bottom surface of the upper die, and press portions that can move up and down and protrude outside the die grooves may be accommodated inside the die grooves.

The shapes of the washer, the carrier, the press portions, and the lower die grooves may change according to shapes and forms of the decoration portions of the original plate.

The decoration portions of the original plate may be letters, figures, symbols, or a combination thereof, and may be processed into flat, curved, or three-dimensional shapes.

According to another aspect of the present invention, there is provided a metal decoration manufacturing method using the metal decoration manufacturing apparatus of claim 1, the metal decoration manufacturing method including: mounting an original plate so that decoration portions of the original plate are aligned with the lower die grooves of a lower die; inserting a carrier having guide holes in the lower portion of an upper die; and moving and pressing the upper die downward to insert the decoration portions of the original plates into the lower die grooves.

The metal decoration manufacturing method may further include, after moving and pressing the upper die downward: preparing a washer configured to be attached onto the rear surface of a final material and including washer segments that have shapes obtained by cutting the decoration portions on the rear surface of the original plate; inserting and aligning the washer into and with the carrier; and placing the final material on the top surface of the lower die on which the decoration portions are inserted into the lower die grooves; wherein the decoration portions of the lower die grooves are transferred and attached onto the front surface of the final material, and the washer segments are attached onto the rear surface of the final material.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Embodiments of the present invention will be described in detail below with reference to the accompanying drawings.

Figure 1:
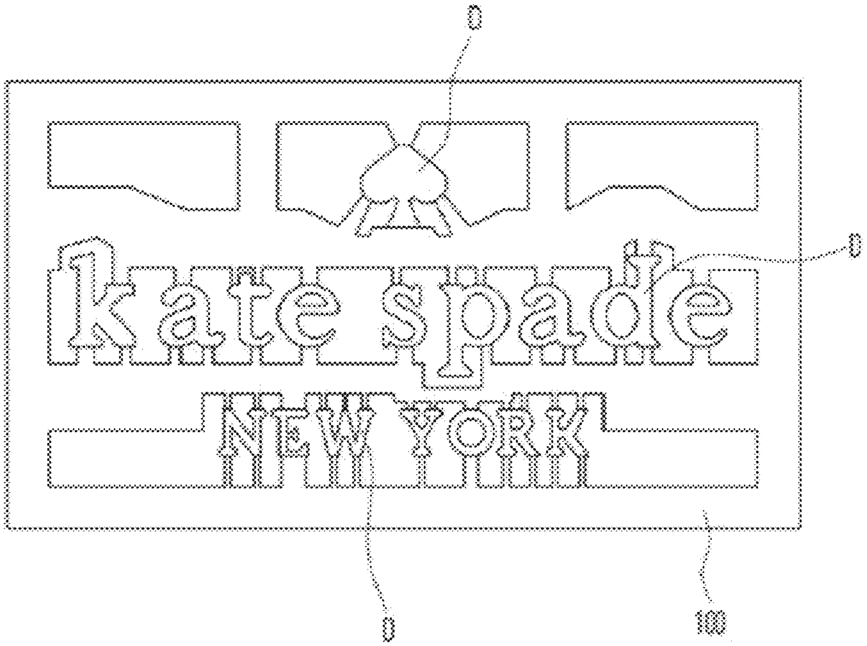
FIG. 1 is a diagram showing the front surface of an original plate for a metal decoration according to the present invention.
Figure 2:
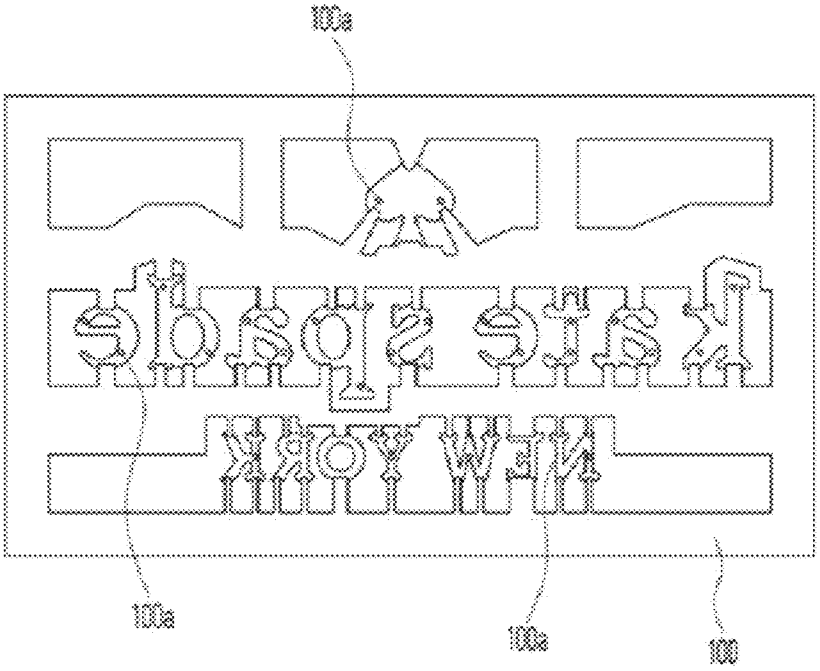
FIG. 2 is a diagram showing the rear surface of the original plate for a metal decoration according to the present invention.

FIG. 1 is a diagram showing the front surface of an original plate (original protocol) 100 for a metal decoration according to the present invention. FIG. 2 is a diagram showing the rear surface of the original plate 100 for a metal decoration according to the present invention. The spade shape on the top side, the "kate spade" shape on the middle side, and the "NEW YORK" shape on the bottom side are connected into an integrated form. The original plate 100 is injection-molded, but may be manufactured by other methods such as press working. The letters are also examples, and may be made up of other letters such as "Gucci," shapes and/or symbols."

Pins 100*a* protrude from the rear surface of the shapes, i.e., the decoration portions D, of the original plate 100, as shown in the drawing. The pins 100*a* are formed when the original plate 100 is injection-molded.

Figure 3:
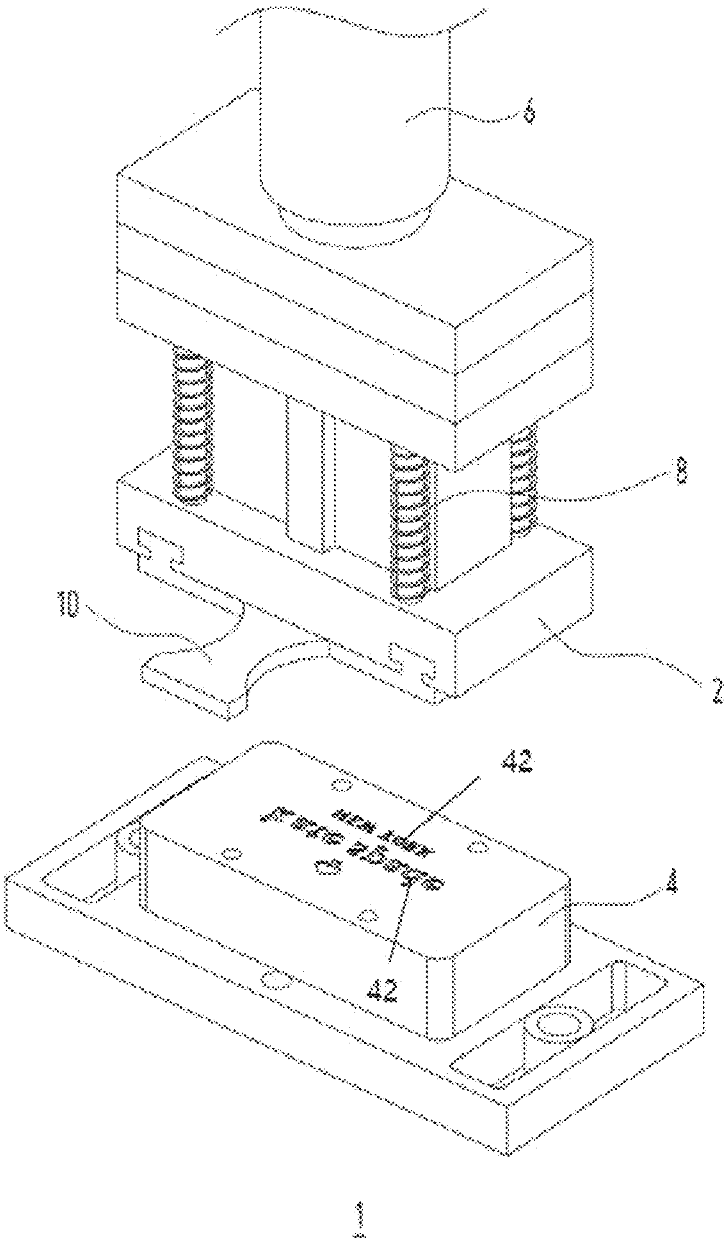
FIG. 3 shows an overall perspective view of a press apparatus for attaching the metal decoration of the invention.

FIG. 3 shows a perspective view of a press apparatus 1 for attaching the metal decoration of the invention. The press apparatus 1 includes an upper die 2 connected by a pusher 6 and springs 8, and a lower die 4 spaced apart from the upper die 2 and made of a flexible material. A grip protrudes from the front of the upper die 2. The grip is the exposed portion of a carrier 10 that is inserted into the upper die 2.

Figure 4:
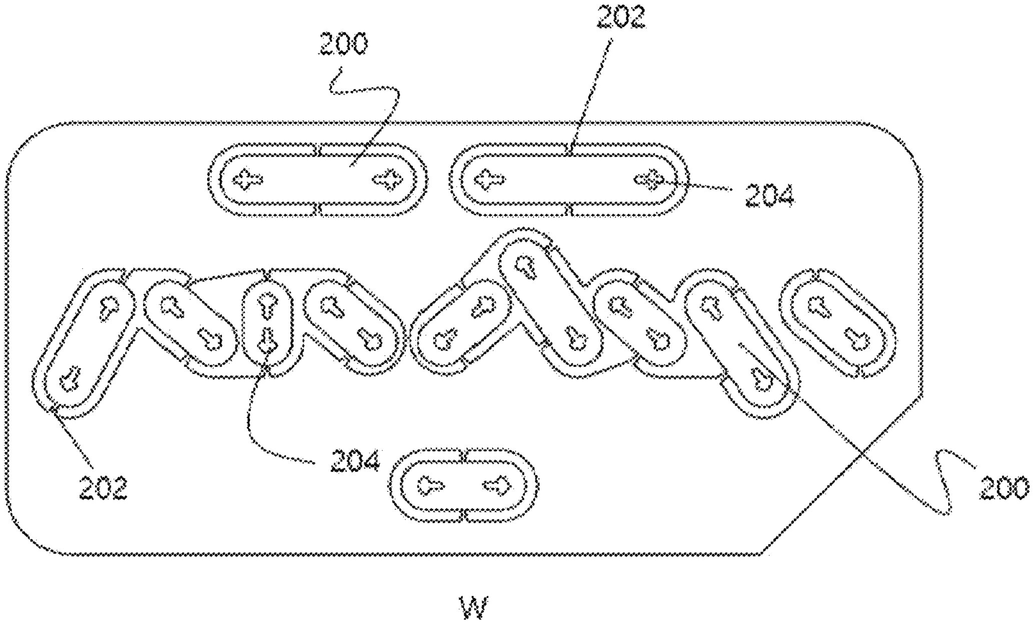
FIG. 4 is a diagram of a washer accommodated in the carrier of the present invention.

FIG. 4 is a diagram of a washer W accommodated in the carrier 10. Washer segments 200 are formed to fit the shapes of the original plate 100 shown in FIG. 1. The two washer segments 200 on the top side correspond to the "NEW" and "YORK" of the original plate 100, respectively, the complex segment 200 on the middle side corresponds to the "kate spade," and the one washer segment 200 at the center of the bottom side corresponds to the spade shape. The washer segments 200 are connected to a body through thin connection portions 202. Washer slots 204 each in the shape of a spade or cross slot having a blunt end are formed near both ends of each of the washer segments 200. The washer segments 200 are attached onto the rear surface of the leather onto which the metal decoration is to be attached.

Figure 5:
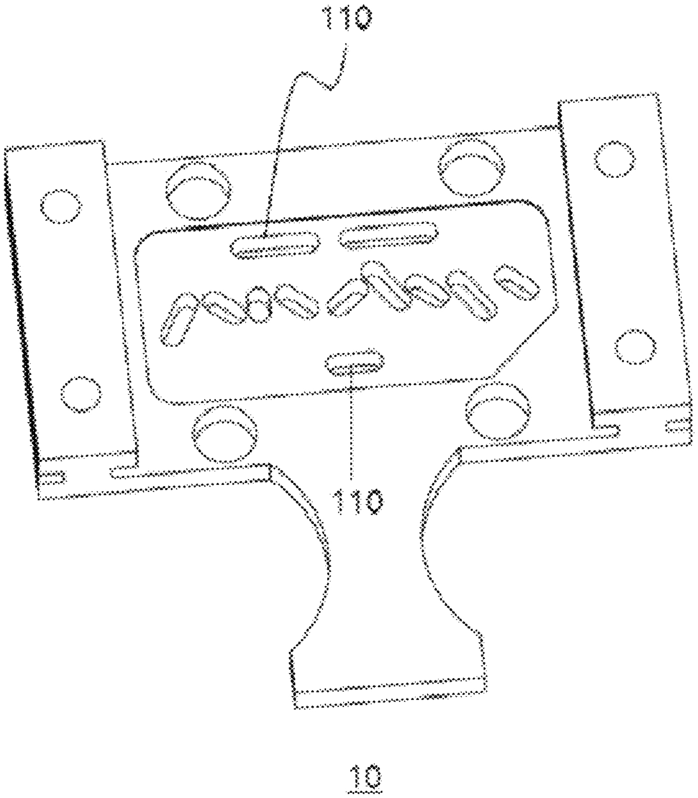
FIG. 5 is a plan view of the carrier inserted into an upper die when viewed from above.
Figure 6:
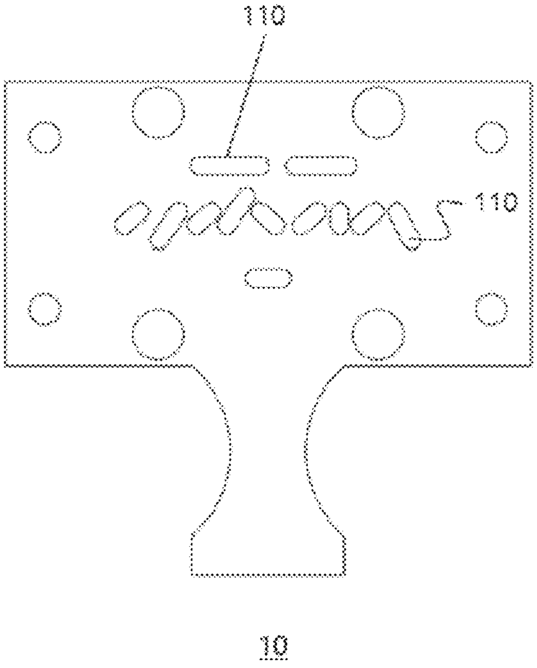
FIG. 6 is a bottom view of the carrier when viewed from below.

FIG. 5 is a plan view of the carrier 10 inserted into the upper die 2 when viewed from above, and FIG. 6 is a bottom view of the carrier 10 when viewed from below. A plurality of guide holes 110 are formed in the carrier 10 in areas corresponding to the washer segments 200. The shapes of the respective guide holes 110 are the same as the shapes of respective empty spaces, i.e., slots, when the respective washer segments 200 are cut in FIG. 4. As will be described later, in a second process, the washers W are inserted such that the segments are aligned with the guide holes 110 of the carrier 10.

Figure 7:
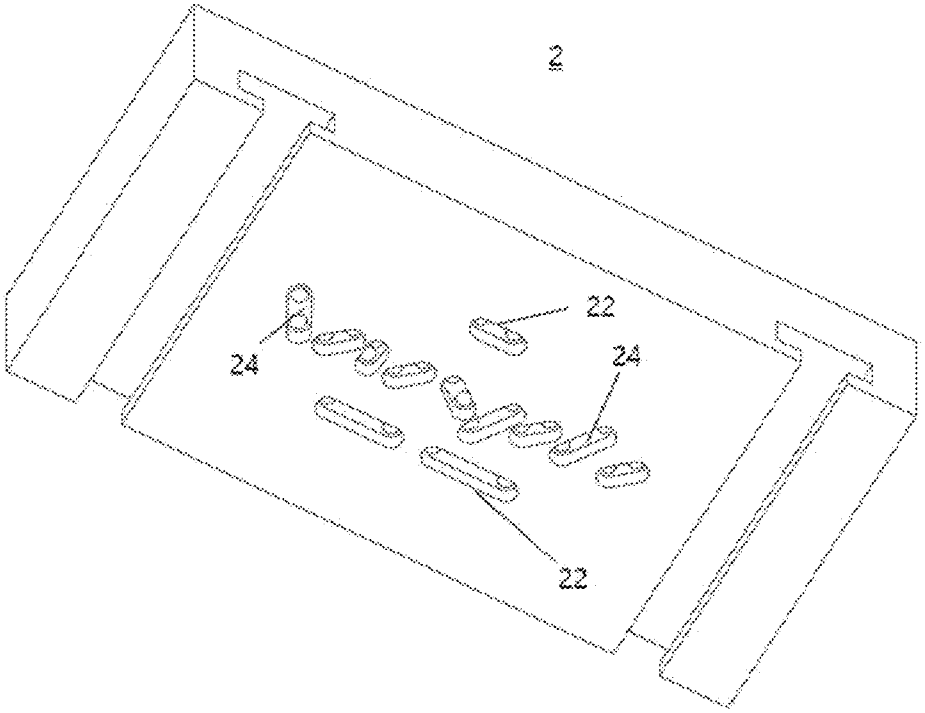
FIG. 7 is a bottom view of the upper die.

FIG. 7 is a view of the bottom surface of the upper die 2 excluding the carrier 10 when viewed from below. Die grooves 22 having the same shapes as the guide holes 110 are formed through the lower surface of the upper die 2. Pressing portions 24 that can move up and down and protrude out of the die grooves 22 are accommodated inside the die grooves 22. The shapes of the pressing portions 24 are the same as the washer segments 202 except that holes larger than the washer slots 204 are formed concavely. The carrier 10 is inserted and aligned below the bottom surface of the upper die 2.

The top surfaces (not shown) of the pressing portions 24 come into contact with the springs 8. When the press apparatus 1 operates and the pusher 6 moves downward, the pressing portions 24 are moved downward away from the die grooves 22 by the springs 8. The downwardly protruding pressing portions 24 are passed through the guide holes 110 of the carrier 10 and moved further downward.

Next, the lower die 4 will be described with reference to FIG. 3. Lower die grooves 42 corresponding to the respective shapes of the original plate 100 are formed in the lower die 4. The lower die 4 may be made of a strong material, but a flexible material is preferred. The shapes of the lower die grooves 42 correspond to the shapes on the front surface of the original plate 100. They may not exactly match the shapes of the washer segments 200 for cutting out shapes from the rear surface of the original plate 100.

A method of manufacturing a metal decoration using the press apparatus 1 of the present invention described above will be described.

A first process is to insert the shapes, i.e., the decoration portions D, of the original plate 100 into the lower die grooves 42 of the lower die 4.

Figure 8A:
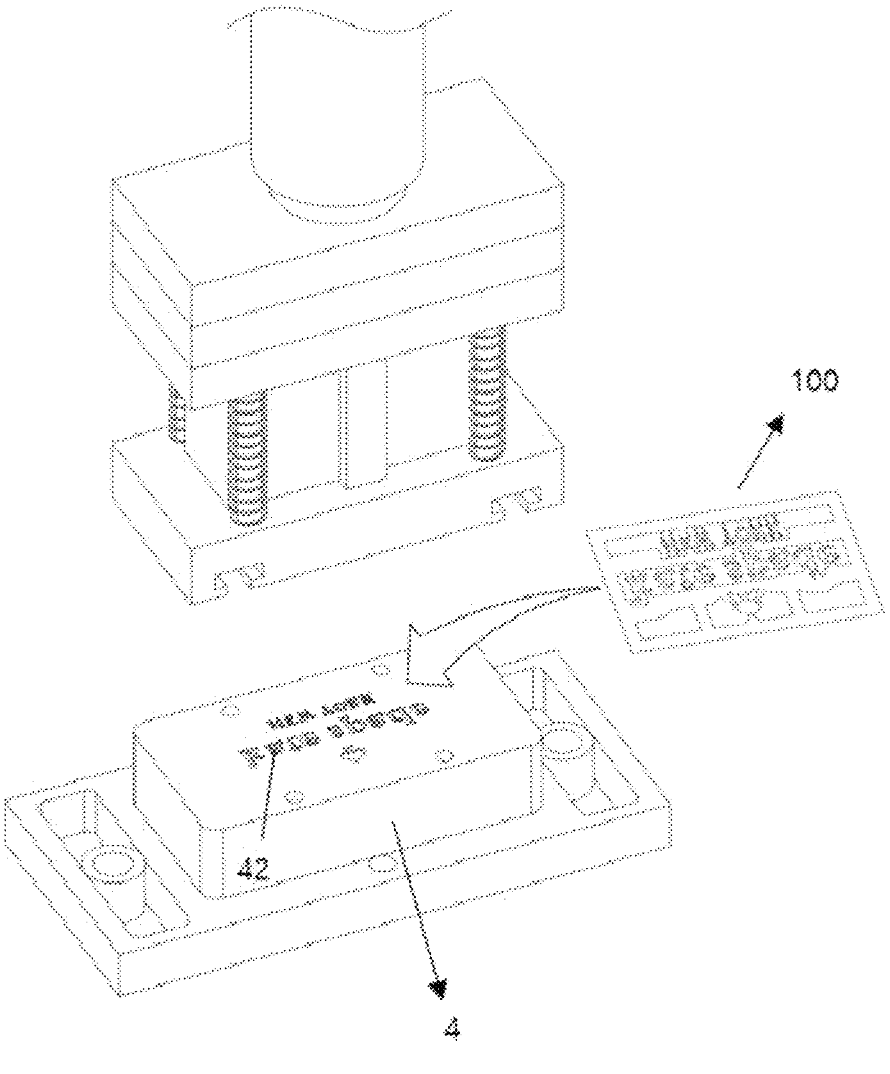
FIGS. 8A-8C are diagram showing the process of inserting the metal decoration of the original plate into a lower die using the press apparatus of the present invention.

For this purpose, first, as shown in FIG. 8A, the lower die 4 is placed on the lower support of the press apparatus 1, and the original plate 100 for a metal decoration is placed on the lower die 4. The rear surface of the original plate 100 is directed upward, and the shapes of the original plate 100 are aligned with the lower die grooves 42.

Figure 8B:
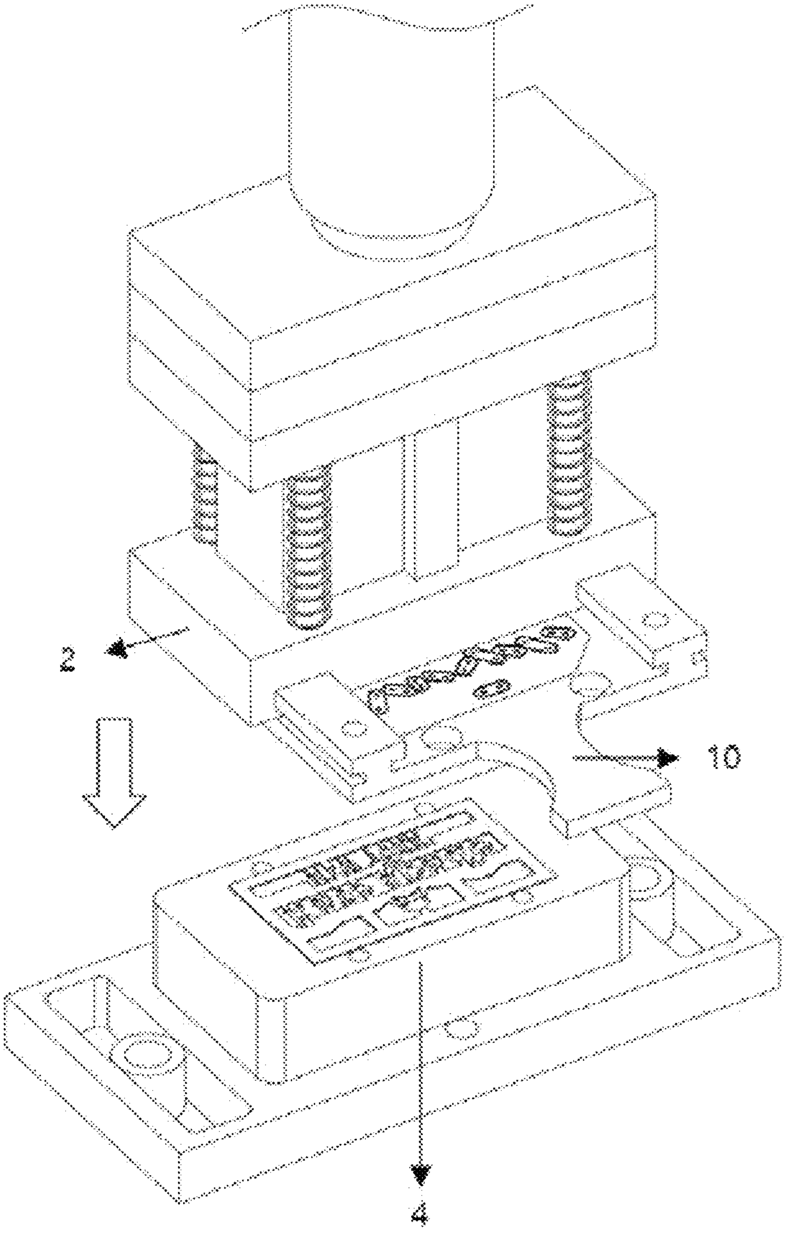

Next, as shown in FIG. 8B, when the carrier 10 is inserted into the upper die 2 and the press apparatus 1 is operated, the upper die 2 moves downward and comes into adjacent contact with the lower die 4. Then, the pressing portions 24 move downward, pass through the guide holes 110 and press the shapes, i.e., the decoration portions D, of the original plate 100. Then, only the decoration portions D are cut out, and these portions are inserted into the respective lower die grooves 42.

Figure 8C:
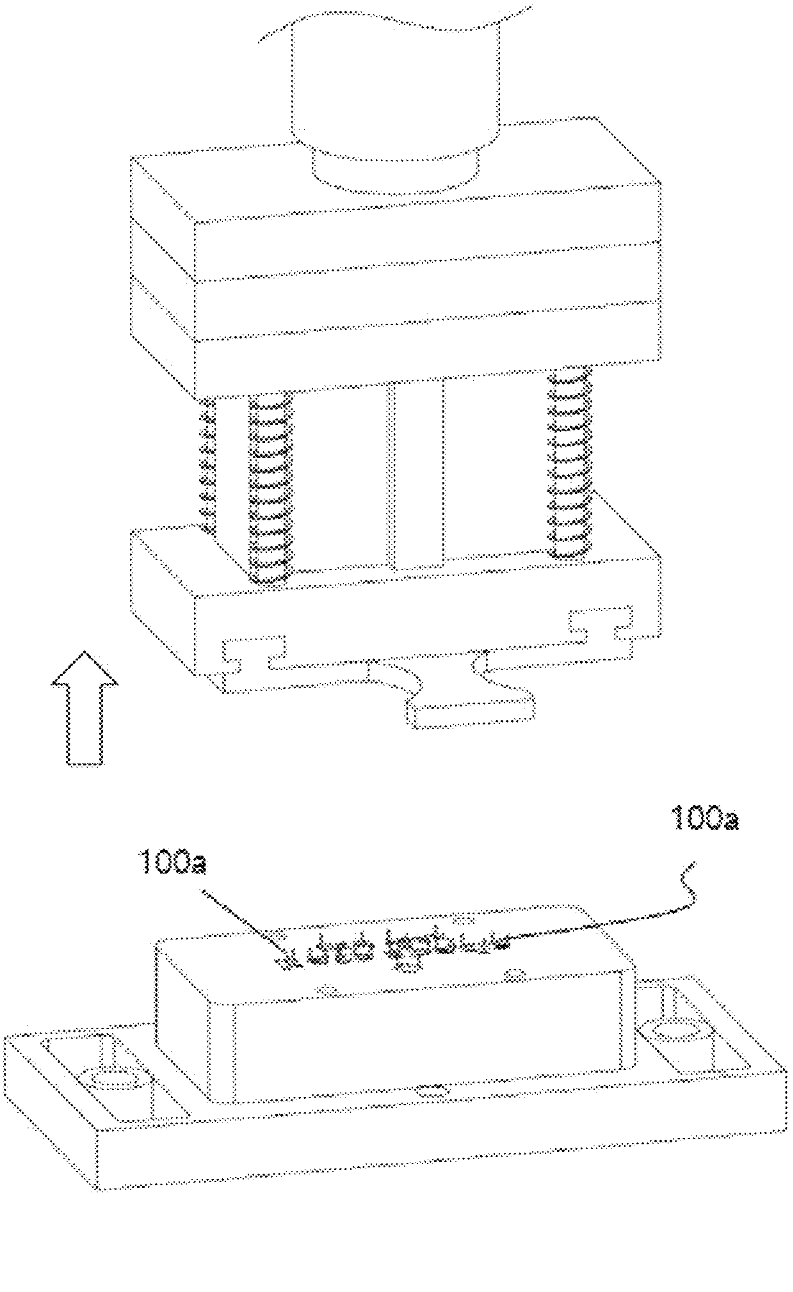

FIG. 8C shows a perspective view of the lower die 4 after the above process has been completed. The decoration portions D are inserted into the lower die grooves 42. The pins 100*a* formed on the rear surfaces of the decoration portions D of the original plate 100 protrude upward.

In a second process, the decoration parts D inserted in the first process are attached onto the front surface of the material forming a final product, and the washer segments 200 are attached onto the rear surface of the material.

Figure 9A:
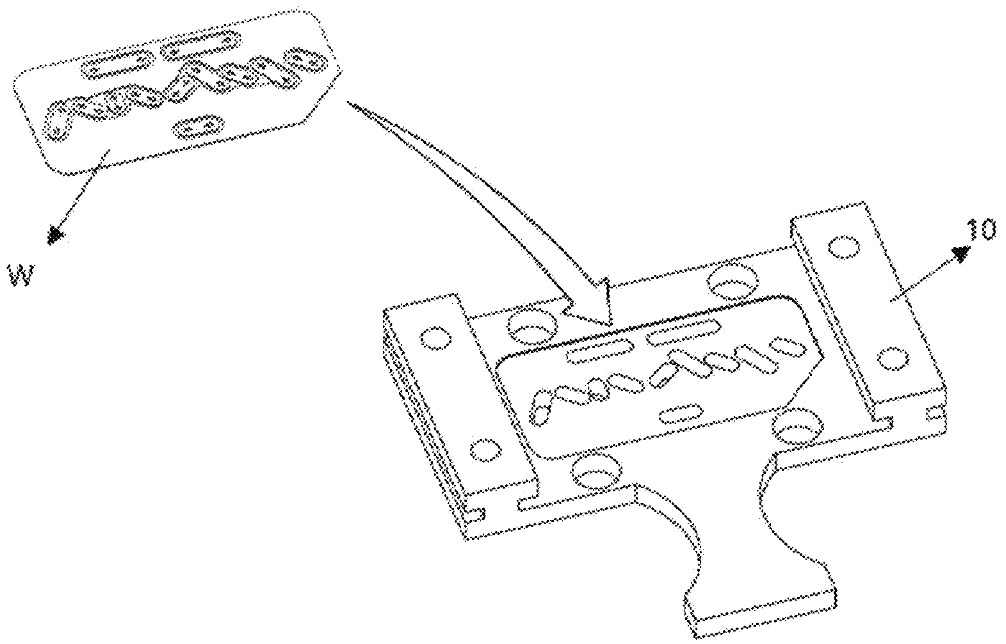
FIGS. 9A-9D are diagram showing a process of attaching a metal decoration, inserted into the lower die, onto the front surface of leather and attaching washer segments, inserted into the upper die, onto the rear surface of the leather using the press apparatus of the present invention.

The press apparatus 1 is moved upward to its original position. Next, as shown in FIG. 9A, the washer W is now aligned with the guide of the carrier 10 and the carrier 10 is inserted back into the upper die 2.

Figure 9B:
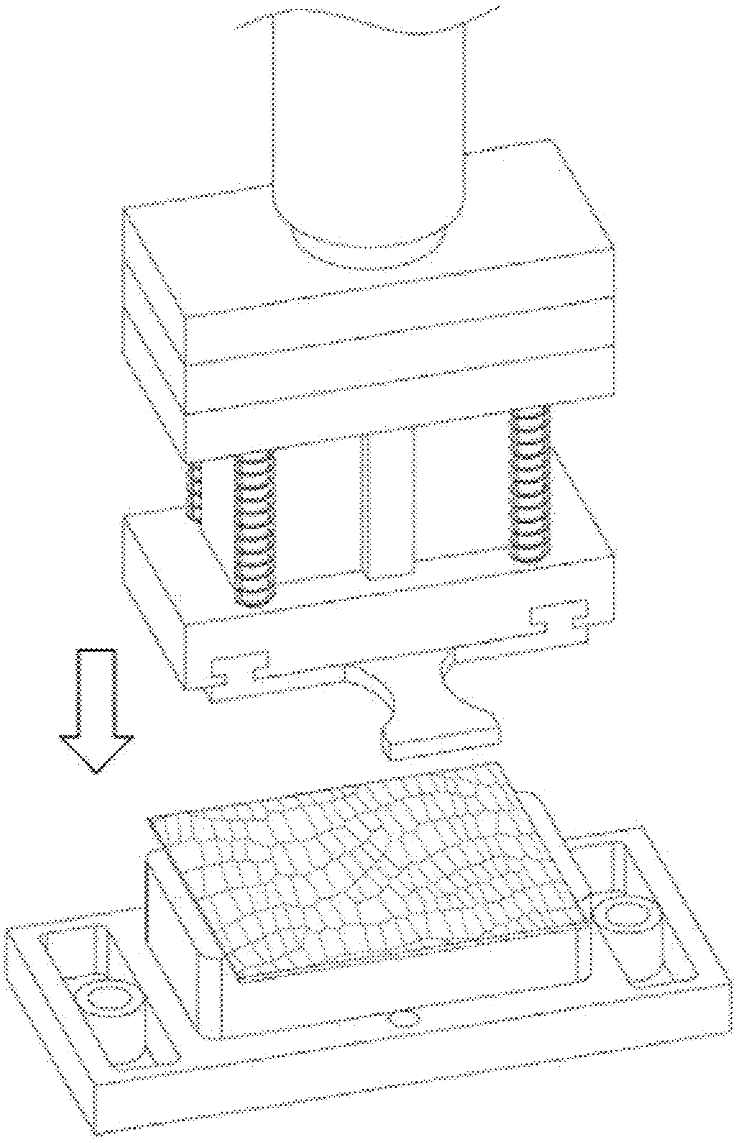

As shown in FIG. 9B, leather forming a final product is placed on the top surface of the lower die 4. The leather is mounted such that the rear surface thereof is directed upward and the front surface thereof is directed downward. When the press apparatus is operated secondarily, the upper die 2 moves downward and begins to come into contact with the lower die 4. The pressing portions 24 move downward and pass through the guide holes 110. In this case, the connection portions 202 of the washer W aligned with the guide holes 110 are cut according to their shapes. The washer segments 200 are separated from the washer W. The washer segments 202 come into contact with the bottom surfaces of the guide holes 110 and are attached onto the rear surface of the leather by receiving the force applied toward the rear surface of the leather by the pressure of the pusher 6. At the same time, the decoration parts D of the lower die 4 are pressed toward the lower die 4, and the decoration portions D are attached onto the front surface of the leather by the reaction. This is similar to printing. Since the lower die 4 is made of an elastic material that can be deformed to a predetermined extent, only the decoration portions D are separated, and thus, the work of moving upward and performing attachment is facilitated.

The pins 100*a* of the decoration portions D protrude through the leather, and ultimately, the ends thereof are received in the cross groove-shaped washer slots 204.

Figure 9C:
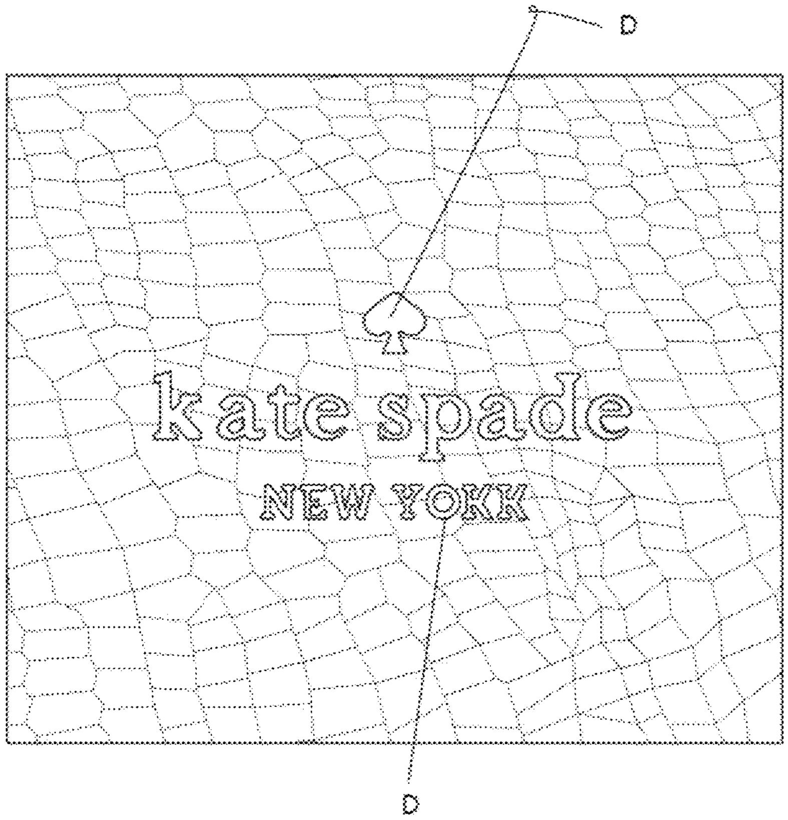
Figure 9D:
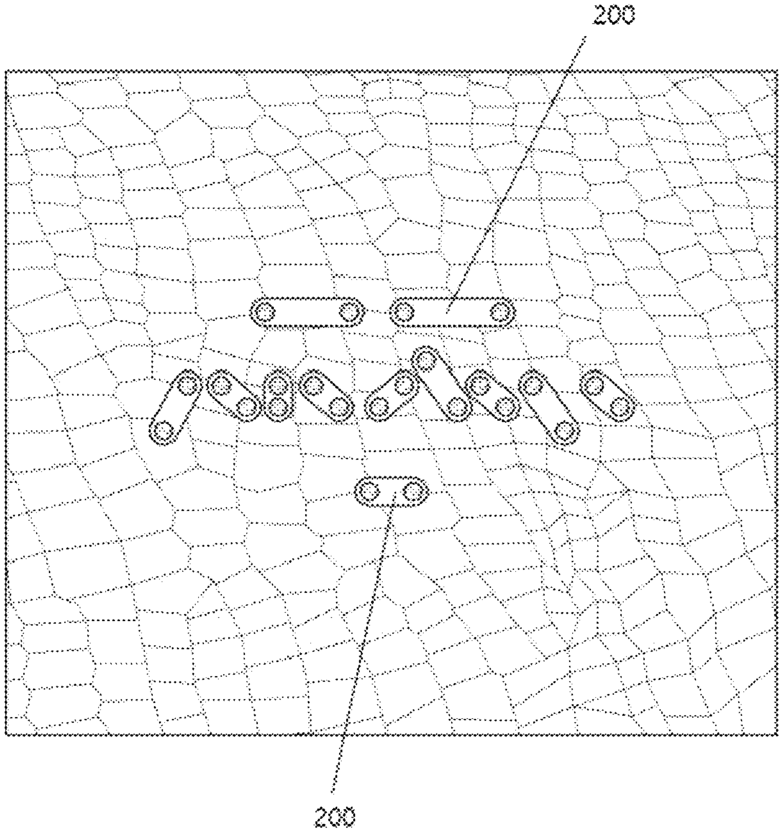

FIG. 9*c* shows a state in which the above process has been completed and the letters and figures of the original plate are attached onto the front surface of the leather. FIG. 9D shows a state in which the washer segments 200 cut out from the washer W are attached. The tips of the pins 100*a* are pressed by the large holes of the pressing portions 24 and are finished in flat, round shapes.

It can be seen that the decoration portions D attached onto the front surface of the leather as well as the washer segments 200 attached onto the rear surface of the leather are made of metal or precious metal and have excellent aesthetics.

An operator or supplier may easily inspect whether the metal decoration has been appropriately attached and perform lateral inspection before and after the leather is attached to or integrated with a final item.

The pressing force and moving speed of the press apparatus 1 are preset to appropriate values according to the material and thickness of the leather.

It will be understood that the shapes of the washer W, the carrier 10, the pressing portions 24, and the lower die grooves 42 need to vary depending on the shape and form of the decoration portions D of the original plate 100. However, their shapes and sizes do not limit the scope of the present invention. The decoration portions D may include shapes and symbols as well as letters, and may be processed into various three-dimensional shapes such as flat decoration portions, curved decoration portions, and convex decoration portions. The characters, carrier, and washer shown in the drawings are presented as examples, and the scope of the present invention may be applied universally to metal decorations.

In the present invention, the overall press process includes the process of first inserting the decoration portions into the lower die, and the process of separating the decoration portions, secondarily attaching the decoration portions onto the front of the material, and making secondary attachment, and simultaneously attaching the washer segments accommodating the pins onto the rear surface of the material using the washer.

As long as the basic principle of the present invention is used, the configuration of the press apparatus may also be modified or altered. Furthermore, it may also be possible to use two press apparatuses for the respective processes rather than using a single press apparatus.

According to the present invention, advantages are provided in that the manufacture of a metal decoration may be performed easily and economically, the number of working hours may be reduced, and manufacturing efficiency may be improved.

Furthermore, according to the present invention, it is easy to inspect the sides of leather, which is the final material, or a bag, which is an item to which the leather will be attached.

Although various alterations and modifications may be made to the present invention, it is obvious that the scope of the present invention extends to the ranges identical or equivalent to the claims to be described below.

What is claimed is:

1. A metal decoration manufacturing apparatus for attaching a decoration of an original plate onto a final material, the metal decoration manufacturing apparatus comprising:

an upper die;

a lower die spaced apart from the upper die, and made of a flexible material; and a washer including washer segments to be attached onto a rear surface of a final material, wherein a carrier provided with guide holes is inserted into a lower portion of the upper die;

wherein lower die grooves corresponding to decoration portions of the original plate are formed in the lower die;

wherein the washer segments have shapes obtained by cutting the decoration portions on a rear surface of the original plate; and wherein the guide holes of the carrier have the same shapes as the washer segments of the washer, die grooves having the same shapes as the guide holes are formed on a bottom surface of the upper die, and press portions that can move up and down and protrude outside the die grooves are accommodated inside the die grooves.

2. The metal decoration manufacturing apparatus of claim 1, wherein pins protrude from the individual decoration portions on the rear surface of the original plate, and washer slots are formed in the washer segments to accommodate the respective pins.

3. The metal decoration manufacturing apparatus of claim 1, wherein shapes of the washer, the carrier, the press portions, and the lower die grooves change according to shapes and forms of the decoration portions of the original plate.

4. The metal decoration manufacturing apparatus of claim 1, wherein the decoration portions of the original plate are letters, figures, symbols, or a combination thereof, and are processed into flat, curved, or three-dimensional shapes.

5. A metal decoration manufacturing method using the metal decoration manufacturing apparatus of claim 1, the metal decoration manufacturing method comprising:

mounting an original plate so that decoration portions of the original plate are aligned with lower die grooves of a lower die;

inserting a carrier having guide holes in a lower portion of an upper die; and moving and pressing the upper die downward to insert the decoration portions of the original plates into the lower die grooves;

preparing a washer configured to be attached onto a rear surface of a final material and including washer segments that have shapes obtained by cutting the decoration portions on a rear surface of the original plate;

inserting and aligning the washer into the carrier; and placing the final material on a top surface of the lower die on which the decoration portions are inserted into the lower die grooves, wherein the decoration portions of the lower die grooves are transferred and attached onto a front surface of the final material, and the washer segments are attached onto the rear surface of the final material.

* * * * *